United States Patent
Tye et al.

(10) Patent No.: US 7,654,718 B2
(45) Date of Patent: Feb. 2, 2010

(54) ELECTRONIC DEVICE WITH DIFFUSED BACKLIT DISPLAY

(75) Inventors: Trentent Tye, Calgary (CA); Troy Tye, St. Albert (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/011,852

(22) Filed: Jan. 30, 2008

(65) Prior Publication Data

US 2009/0190358 A1  Jul. 30, 2009

(51) Int. Cl.
    *F21V 7/04* (2006.01)
(52) U.S. Cl. .................. 362/603; 362/330; 362/605
(58) Field of Classification Search .......... 362/330, 362/458, 602–603, 605; 361/679–681, 683
    See application file for complete search history.

(56) References Cited

U.S. PATENT DOCUMENTS

| | | | |
|---|---|---|---|
| 4,343,975 A * | 8/1982 | Sado | ................ 200/314 |
| 6,179,432 B1 * | 1/2001 | Zhang et al. | ................ 362/84 |
| 6,277,312 B1 | 8/2001 | Hansen et al. | |
| 6,760,084 B2 | 7/2004 | Cole et al. | |
| 6,764,760 B2 | 7/2004 | Nishizawa et al. | |
| 6,977,808 B2 | 12/2005 | Lam et al. | |
| 2003/0161093 A1 | 8/2003 | Lam et al. | |
| 2006/0012949 A1 | 1/2006 | Hutchinson et al. | |
| 2006/0214322 A1 | 9/2006 | Liu et al. | |
| 2007/0026197 A1 | 2/2007 | Suga et al. | |

\* cited by examiner

*Primary Examiner*—Jason Moon Han

(57) ABSTRACT

An electronic device comprises a housing having a panel with an opening extending therethrough, a light source disposed within the electronic device and configured to transmit light through the opening, an optically-transmissive layer located on a side of the panel opposite a side of the light source and extending over the opening, and a reflective element disposed on the optically-transmissive layer and located at least partially coincident with a location of the opening.

18 Claims, 2 Drawing Sheets

ELECTRONIC DEVICE WITH DIFFUSED BACKLIT DISPLAY

BACKGROUND

Electronic devices sometimes contain images or logos indicating the source or manufacturer of the electronic device. For example, one type of electronic device comprises a display enclosure of a portable computer having a logo thereon that may be illuminated. However, the logo may be difficult to discern in well lit environments or distracting in low lit environments.

DETAILED DESCRIPTION OF THE DRAWINGS

Figure 1:
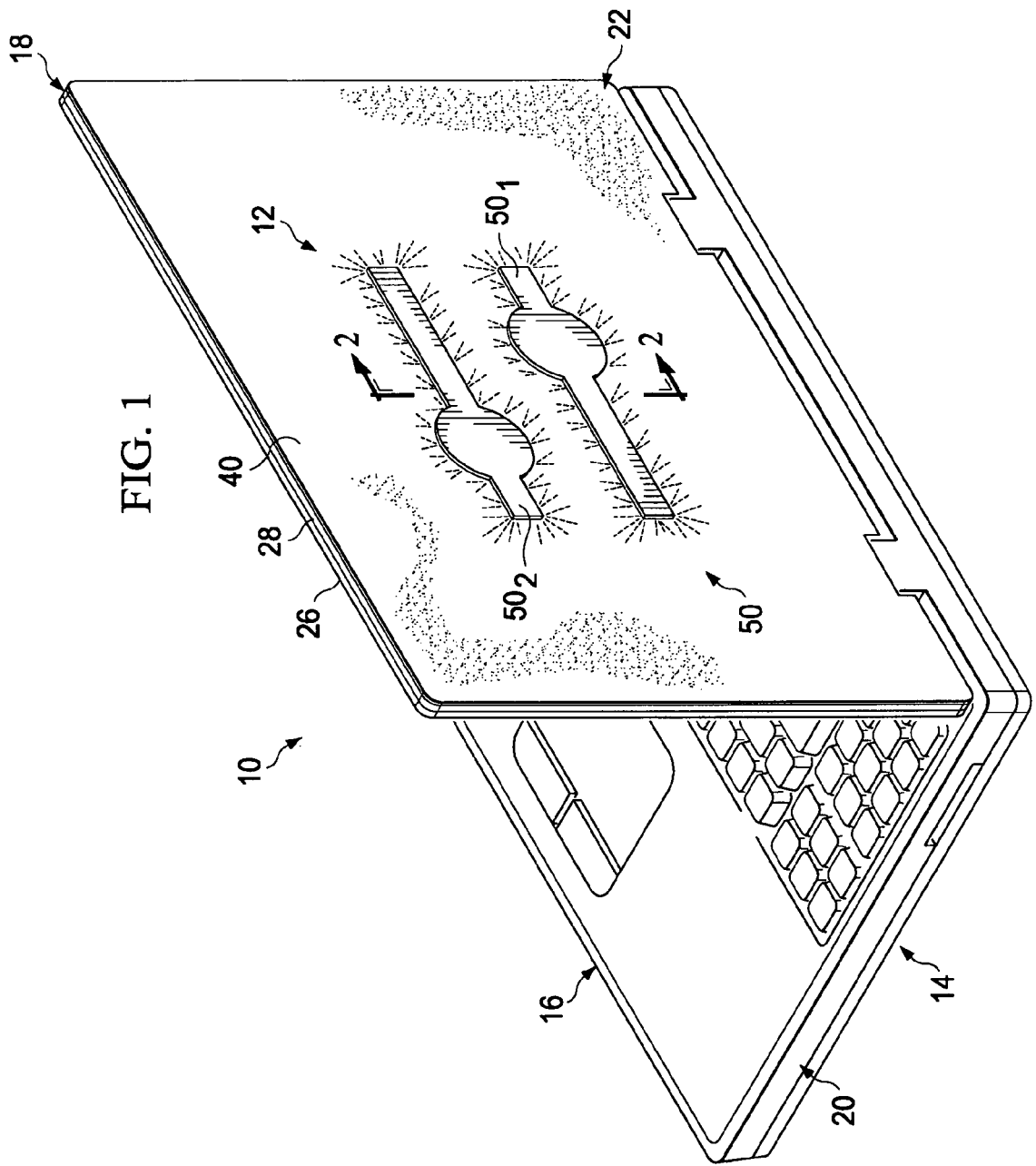
FIG. 1 is a diagram illustrating an electronic device in which a diffused backlit display is employed to advantage.
Figure 2:
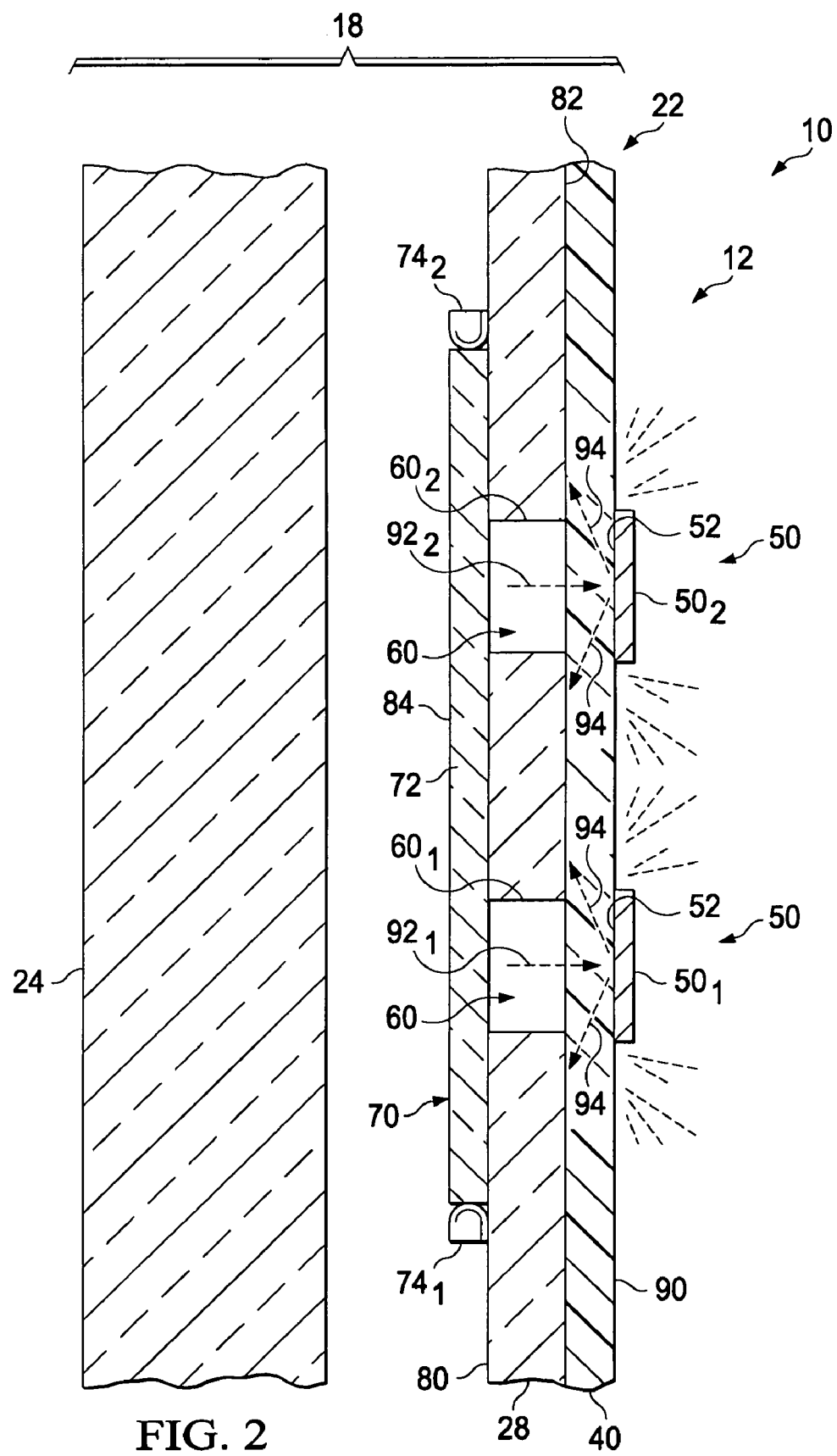
FIG. 2 is a diagram illustrating a section view of the electronic device and backlit display of FIG. 1 taken along the line 2-2 of FIG. 1.

FIG. 1 is a diagram illustrating an embodiment of an electronic device 10 in which a diffused backlit display 12 is employed to advantage, and FIG. 2 is a diagram illustrating a section view of electronic device 10 and backlit display 12 of FIG. 1 taken along the line 2-2 of FIG. 1. In the embodiment illustrated in FIGS. 1 and 2, electronic device 10 comprises a notebook computer 14 having a base member 16 rotatably coupled to a display member 18. However, it should be understood that electronic device 10 may comprise other types of devices such as, but not limited to, a tablet computer, a personal digital assistant, a gaming device, a media player, a desktop computer, a cellular telephone and/or any other type of portable or non-portable electronic device. In the embodiment illustrated in FIGS. 1 and 2, base member 16 and display member 18 each comprise a housing 20 and 22, respectively, formed by a plurality of walls and/or panels for supporting and/or otherwise storing various types of components of electronic device 10 therein. For example, in the embodiment illustrated in FIG. 1, housing 22 is used to support a display screen 24 for providing and/or otherwise displaying image content. In FIGS. 1 and 2, housing 22 comprises a front panel 26 and a back panel 28. However, it should be understood that housing 22 and/or display, member 18 may be otherwise configured.

In the embodiment illustrated in FIGS. 1 and 2, backlit display 12 is disposed on/in display member 18; however, it should be understood that backlit display 12 may be located elsewhere on electronic device 10. Backlit display 12 may be formed and/or otherwise manufactured to represent any type of logo, design, picture, illustration, graphic element or other type of illustrative element. In some embodiments, display member 18 is formed such that light emitted by a light source disposed within display member 18 is emitted through an opening in a panel or support member of display member 18 toward an exterior of electronic device 10 and is diffused by one or more reflective elements 50, thereby forming a diffused and/or silhouette-like light emission pattern. In FIGS. 1 and 2, two reflective elements $50_1$ and $50_2$ are illustrated; however, it should be understood that a greater or fewer quantity of discrete and/or joined reflective elements 50 may be used.

Referring to FIG. 2, backlit display 12 comprises a light source 70 disposed within display member 18 for emitting light through one or more openings 60 toward an exterior of electronic device 10. In FIG. 2, two openings $60_1$ and $60_2$ are illustrated as extending through panel 28; however, it should be understood that a greater or fewer quantity of discrete and/or joined openings 60 may be used. Opening(s) 60 may be formed in panel 28 during the manufacturing of panel 28 (e.g., during the molding process of panel 28) of formed in panel 28 at any time thereafter. In FIGS. 1 and 2, two reflective elements 50 are used to correspond to the two illustrated openings 60. For example, in some embodiments, reflective elements 50 are formed and/or otherwise constructed having a size/shape or pattern corresponding to the size/shape or pattern of openings 60. In some embodiments, reflective elements 50 are formed and/or otherwise constructed having dimensions that match the dimensions of respective openings 60; however, it should be understood that the dimensions of reflective elements 50 may vary (e.g., slightly greater than and/or slightly less than the dimensions of respective openings 60).

In the embodiment illustrated in FIG. 2, light source 70 comprises a light guide 72 configured to direct light received from one or more light emitting diodes (LEDs) $74_1$ and $74_2$ through openings 60. In FIG. 2, light guide 72 is disposed between an internal side 80 of panel 28 and display screen 24 of display member 18. Additionally, in FIG. 2, two LEDs are illustrated (LEDs $74_1$ and $74_2$); however, it should be understood that a greater or fewer quantity of LEDs may be used, or a type of light source different than LEDs may be used (e.g., light from display screen 24). In some embodiments, light guide 72 comprises a reflective and/or diffusive surface/layer 84 disposed on a side thereof opposite openings 60 to facilitate directing light emitted by LEDs $74_1$ and $74_2$ through openings 60. However, it should be understood that light guide 72 may be otherwise configured. Further, in FIG. 2, light guide 72 is illustrated as being spaced apart from display screen 24; however, it should be understood that in some embodiments, light guide 72 and display screen 24 and/or other components within display member 18 may abut each other. Light source 70 may be affixed and/or attached to panel 28, attached to other structure residing in display member 18, or otherwise positioned/secured within display member 18. It should be understood that in some embodiments, light guide 72 may be omitted such that light from a different light source is used to pass through openings 60 such as, but not limited to, light from display screen 24.

In the embodiment illustrated in FIGS. 1 and 2, backlit display 12 comprises an optically-transmissive layer 40 disposed on an exterior side 82 of panel 28 and extending over opening(s) 60. Layer 40 is configured to transmit light therethrough that is received from opening(s) 60. Layer 40 may comprise a transparent layer or translucent layer to facilitate the transmission of light therethrough. In the embodiment illustrated in FIGS. 1 and 2, layer 40 is formed having overall length/width dimensions corresponding to the overall length/width dimensions of panel 28. However, it should be understood that layer 40 may be formed having more localized dimensions (e.g., having dimensions that correspond more closely with the area(s) of panel 28 having opening(s) 60 formed therein). In some embodiments, layer 40 comprises a transparent/translucent coating that is applied to and/or otherwise formed on side 82 of panel 28. In some embodiments, layer 40 may comprise a transparent/translucent panel that is secured, attached or otherwise bonded to side 82 of panel 28. For example, layer 40 may be formed on and/or with panel 28 in connection with the manufacturing/molding of panel 28 (e.g., an optically-transmissive thermoplastic and/or resin molded onto and/or otherwise cured during or after the formation of panel 28), or layer 40 may be applied to and/or otherwise affixed to panel 28 after completion of panel 28 (e.g., a transparent/translucent panel attached to panel 28 or a transparent/translucent coating applied to side 82 of panel 28 after panel 28 has been completely molded/cured). A thickness of layer 40 may be varied to obtain desired light transmission/diffusion properties. For example, in some embodiments, a thickness of layer 40 may be approximately two to seven millimeters, or possibly one to ten millimeters. It should be understood that the thickness of layer 40, as well as the level of light transmissivity of layer 40, may be varied to obtain desired light transmission/diffusion properties, which may also vary based on the type of electronic device in which display 12 is incorporated.

Backlit display 12 comprises one or more reflective element(s) 50 to produce a diffused and/or silhouette-like lighted display corresponding to opening(s) 60. For example, in some embodiments, reflective element(s) 50 comprises an opaque material and/or layer having a reflective surface 52 facing toward opening(s) 60 to reflect/diffuse the light received from opening(s) 60. Reflective element(s) 50 is generally sized/shaped or patterned to correspond to the size/shape or pattern of opening(s) 60. Further, reflective element(s) 50 is disposed over and/or is otherwise aligned with opening(s) 60 such that the location of reflective element(s) 50 coincides with a location of opening(s) 60. It should be understood that reflective element(s) 50 may be sized having dimensions that are slightly greater than or less than the dimensions of a respective opening 60. Reflective element(s) 50 may comprise any type of material, and reflective surface 52 may be formed having a variety of different textures for reflecting/diffusing light that impinges thereon. For example, in some embodiments, reflective element(s) 50 comprises a foil-like element that is applied and/or otherwise affixed to a side 90 of layer 40 (e.g., by adhesive or another attachment method). However, it should be understood that reflective element(s) 50 may be otherwise formed (e.g., formed as part of layer 40). It should be understood that in FIG. 2, the thickness of reflective element(s) 50, layer 40, panel 28 and/or light source 70 are exaggerated to better illustrate and describe the operation/function of the various components thereof. For example, in some embodiments, reflective element(s) 50 resides on side 90 of layer 40 to be flush or nearly flush with the exterior surface of layer 40. In some embodiments, reflective element(s) 50 are formed and/or otherwise located within layer 40 to be flush or nearly flush with the exterior surface of layer 40 (e.g., disposed with a recess formed on an exterior surface of layer 40 or located within layer 40 during the manufacture/curing or layer 40). Thus, it should be understood that various methods and/or manufacturing techniques may be used to form layer 40 and/or reflective element(s) 50.

In operation, light from light source 70 is emitted through opening(s) 60 as represented by arrows $92_1$ and $92_2$. The light passing through opening(s) 60 passes through layer 40 and impinges against reflective surface 52 of respective reflective elements 50. In response to impinging against reflective surface 52 of respective reflective elements 50, the light is reflected and/or otherwise diffused in various directions within layer 40 as represented by arrows 94. Some of the light reflected and/or otherwise diffused within layer 40 exits side 90 of layer 40 to produce a silhouette-like display corresponding to opening(s) 60/reflective element(s) 50. For example, in some embodiments, reflective element(s) 50 block the light from exiting layer 40 in the location corresponding to the location of opening(s) 60, thereby producing a silhouette-effect light pattern corresponding to opening(s) 60/reflective element(s) 50. Thus, in some embodiments, light source 70 transmits light from side 80 of panel 20 toward side 82 through opening(s) 60. The light then impinges against reflective element(s) 50 and is at least partially reflected back toward side 82 and at least partially throughout layer 40. Thus, in some embodiments, reflective element(s) 50 cause the light received from light source 70 to be diffused in directions other than the directed the light is received from light source 70 to produce a silhouette-effect light pattern corresponding to opening(s) 60/reflective element(s) 50. It should be understood that in some embodiments, reflective element(s) 50 may be formed of a semi-opaque material that provide some level of light transmission while also providing reflective/diffusive light scattering as indicated above.

Thus, embodiments of backlit display 12 enable any type of graphical/design element to be formed on and/or provided on electronic device 10 to produce a silhouette-like lighted display of such graphical/design element. It should be understood that additional design elements may be incorporated into/onto layer 40 beyond the edges of reflective element(s) 50 and/or on side 82 of panel 28, thereby enhancing the visual effect resulting from light being diffused through layer 40.

What is claimed is:

1. A portable electronic device, comprising:
    a housing having a panel with an opening extending therethrough;
    a light source disposed within the electronic device and configured to transmit light through the opening;
    an optically-transmissive layer located on a side of the panel opposite a side of the light source and extending over the opening; and
    a reflective element disposed on the optically-transmissive layer and located at least partially coincident with a location of the opening, wherein the light transmitting through the opening impinges against the reflective element across the opening, wherein the light transmitting through the opening reflects from the reflective element to produce a silhouette-effect light pattern at the opening.

2. The device of claim 1, wherein the reflective element has a shape that corresponds to a shape of the opening.

3. The device of claim 1, wherein the reflective element is aligned with and disposed over the opening such that a location of the reflective element coincides with a location of the opening.

4. The device of claim 1, wherein the optically-transmissive layer comprises an optically-transmissive coating applied to the panel.

5. The device of claim 1, wherein the reflective element comprises a reflective surface facing the opening.

6. The device of claim 1, wherein the housing comprises a display housing of a notebook computer.

7. The device of claim 1, wherein the electronic device comprises at least one of the group of a notebook computer, a cellular telephone, a personal digital assistant, a tablet computer, and a gaming device.

8. The device of claim 1, wherein the reflective element comprises a pattern corresponding to a pattern of the opening.

9. A method for manufacturing a portable electronic device, comprising:
    providing a housing having a panel with an opening extending therethrough;
    disposing a light source within the electronic device for transmitting light through the opening;
    providing an optically-transmissive layer located on a side of the panel opposite a side of the light source, the optically-transmissive layer extending over the opening; and locating a reflective element on the optically-transmissive layer, the reflective element located at least partially aligned with a location of the opening such that light transmits through the panel, impinges against the reflective element, and is reflected back to produce a silhouette-effect light pattern corresponding to the opening.

10. The method of claim 9, further comprising forming the optically-transmissive layer by applying an optically-transmissive coating to the panel.

11. The method of claim 9, further comprising locating a reflective surface of the reflective element facing the opening.

12. The method of claim 9, further comprising providing the reflective element having a pattern corresponding to a pattern of the opening.

13. The method of claim 9, wherein providing the optically-transmissive layer comprises providing a transparent layer.

14. A portable electronic device, comprising:
- a housing having a panel with an opening extending from a first side of the panel to a second side of the panel;
- a light source configured to transmit light through the opening from the first side toward the second side;
- a reflective element aligned with and disposed over the opening to receive the light transmitting through the opening and reflect the light toward the second side of the panel; and
- an optically-transmissive layer extending over the opening and located between the second side of the panel and the reflective element, wherein the light transmitting through the opening reflects from the reflective element to produce a silhouette-effect light pattern at the opening.

15. The device of claim 14, wherein the optically-transmissive layer comprises a translucent layer.

16. The device of claim 14, wherein the optically-transmissive layer comprises an optically-transmissive coating applied to the panel.

17. The device of claim 14, wherein the reflective element comprises a reflective surface facing the second side of the panel.

18. The device of claim 14, wherein the reflective element comprises a pattern corresponding to a pattern of the opening.

* * * * *